(12) United States Patent
Tamilselvam et al.

(10) Patent No.: US 11,847,443 B2
(45) Date of Patent: Dec. 19, 2023

(54) CONSTRAINTS-BASED REFACTORING OF MONOLITH APPLICATIONS THROUGH ATTRIBUTED GRAPH EMBEDDINGS

(71) Applicant: International Business Machines Corporation, Armonk, NY (US)

(72) Inventors: Srikanth Govindaraj Tamilselvam, Bangalore (IN); Utkarsh Milind Desai, Bangalore (IN); Sambaran Bandyopadhyay, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/467,690

(22) Filed: Sep. 7, 2021

(65) Prior Publication Data

US 2023/0084685 A1 Mar. 16, 2023

(51) Int. Cl.
*G06F 8/72* (2018.01)
*G06F 8/75* (2018.01)
*G06N 3/02* (2006.01)

(52) U.S. Cl.
CPC .......... *G06F 8/72* (2013.01); *G06F 8/75* (2013.01); *G06N 3/02* (2013.01)

(58) Field of Classification Search
CPC .............. G06N 3/02; G06F 8/75; G06F 8/72
See application file for complete search history.

(56) References Cited

U.S. PATENT DOCUMENTS

| | | | |
|---|---|---|---|
| 10,430,250 B2 | 10/2019 | Ishikawa et al. | |
| 10,637,952 B1 | 4/2020 | Koenig et al. | |

(Continued)

FOREIGN PATENT DOCUMENTS

| | | |
|---|---|---|
| CN | 109948710 | 6/2019 |
| CN | 112398899 | 2/2021 |

(Continued)

OTHER PUBLICATIONS

IBM: List of IBM Patents or Patent Applications Treated as Related, Dec. 16, 2021, pp. 1-2.

(Continued)

*Primary Examiner* — Wei Y Zhen
*Assistant Examiner* — Amir Soltanzadeh
(74) *Attorney, Agent, or Firm* — Ryan, Mason & Lewis, LLP

(57) ABSTRACT

Methods, systems, and computer program products for constraints-based refactoring of monolith applications through attributed graph embeddings are provided herein. A computer-implemented method includes performing an analysis of source code of a monolith application to identify structural features and behavioral features; generating a graph structure representing the monolith application based on the identified structural features and the identified behavioral features, wherein the graph structure comprises: a plurality of nodes, each node corresponding to one of a plurality of software modules of the monolith application, and a plurality of edges between the plurality nodes, each edge representing a relationship of the corresponding nodes; automatically identifying constraints associated with the plurality of nodes in the graph structure based on the analysis of the source code; clustering the nodes using a convolutional neural network based the constraints; and outputting candidate microservices corresponding to respective ones of the clusters for refactoring the monolith application.

20 Claims, 11 Drawing Sheets

(56) References Cited

U.S. PATENT DOCUMENTS

| | | | |
|---|---|---|---|
| 10,936,291 | B1 | 3/2021 | Gamliel et al. |
| 11,467,826 | B1 | 10/2022 | Chawda et al. |
| 2003/0005258 | A1 | 1/2003 | Modha et al. |
| 2017/0187785 | A1 | 6/2017 | Johnson et al. |
| 2017/0364434 | A1 | 12/2017 | Kairali et al. |
| 2018/0365008 | A1 | 12/2018 | Chandramouli et al. |
| 2019/0108067 | A1* | 4/2019 | Ishikawa ................ G06F 8/76 |
| 2019/0116047 | A1 | 4/2019 | Struttmann et al. |
| 2019/0138428 | A1* | 5/2019 | Sumitomo .......... G06F 9/44536 |
| 2019/0250912 | A1 | 8/2019 | Gavisiddappa Kodigenahalli et al. |
| 2019/0279038 | A1* | 9/2019 | Nicol ................. G06K 9/6257 |
| 2019/0361686 | A1 | 11/2019 | Gnazdowsky et al. |
| 2020/0042315 | A1 | 2/2020 | Gupta |
| 2020/0042328 | A1* | 2/2020 | Gupta ..................... H04L 67/34 |
| 2020/0097390 | A1 | 3/2020 | Gunter |
| 2020/0160121 | A1 | 5/2020 | Parasrampuria et al. |
| 2020/0192690 | A1 | 6/2020 | Gupta et al. |
| 2020/0218634 | A1* | 7/2020 | Jones ....................... G06F 8/43 |
| 2020/0401386 | A1* | 12/2020 | Punathil ................ G06F 8/433 |
| 2021/0011688 | A1 | 1/2021 | Sasidharan et al. |
| 2021/0124577 | A1* | 4/2021 | Gupta ................. G06F 9/45533 |
| 2021/0232390 | A1 | 7/2021 | Hwang et al. |
| 2022/0060431 | A1 | 2/2022 | Vadayadiyil Raveendran et al. |
| 2022/0188104 | A1 | 6/2022 | Wan et al. |
| 2022/0301173 | A1* | 9/2022 | Cheng ................ G06V 10/7635 |

FOREIGN PATENT DOCUMENTS

| | | |
|---|---|---|
| CN | 113204465 | 8/2021 |
| WO | 2019209231 A2 | 10/2018 |
| WO | 2021064058 A1 | 4/2021 |

OTHER PUBLICATIONS

Tamilselvam, Srikanth Govindaraj et al., Pending U.S. Appl. No. 17/538,355, filed Nov. 30, 2021, titled "Identifying Microservices for a Monolith Application Through Static Code Analysis".

Sridhara, Giriprasad, et al., Pending U.S. Appl. No. 17/489,280, filed Sep. 29, 2021, titled "Translating Clusters of a Monolith Application to Microservices".

Desai, Utkarsh Milind et al., Pending U.S. Appl. No. 17/543,312, filed Dec. 6, 2021, titled "Multi-Objective Driven Refactoring of a Monolith Application Using Reinforcement Learning".

Mazlami, Genc, Jürgen Cito, and Philipp Leitner. "Extraction of microservices from monolithic software architectures." 2017 IEEE International Conference on Web Services (ICWS). IEEE, 2017.

De Alwis, Adambarage Anuruddha Chathuranga, et al. "Function-splitting heuristics for discovery of microservices in enterprise systems." International Conference on Service-Oriented Computing. Springer, Cham, 2018.

System and Method for Cognitive Microservices Recommendations, IP.com Prior Art Database, Nov. 30, 2020.

Diluting Outliers for Refactoring Monolith Application through Attributed Graph Embeddings, IP.com Prior Art Database, Sep. 7, 2020.

System and Method for Identifying Critical Business Cases from a Monolith Application being Modernized with Optimized Business Value, IP com Prior Art Database, Aug. 16, 2020.

Creating composite UI based on microservices, Microsoft Corporation, https://docs.microsoft.com/en-us/dotnet/architecture/microservices/architect-microservice-container-applications/microservice-based-composite-ui-shape-layout, last accessed Nov. 30, 2021, published Sep. 15, 2021.

Jackson Cam, Micro Frontends, https://martinfowler.com/articles/micro-frontends.html, last accessed Nov. 30, 2021, published Jun. 19, 2019.

Geers, Michael, What are Micro Frontends?, https://micro-frontends.org/, last accessed Nov. 30, 2021.

Gill, Navdeep Singh, Understanding Integration of dot js Frameworks to Micro Frontend, available at https://www.kenonstack.com/blog/js-integration-micro-frontend, last accessed Nov. 30, 2021, published Mar. 21, 2019.

Witkowski, Robert, UI in Microservices World—Micro Frontends pattern and Web Components, available at https://medium.com/@witek1902/ui-in-microservices-world-micro-frontends-pattern-and-web-components-23607a569363, last accessed Nov. 30, 2021, published Dec. 13, 2018.

What is Micro Frontend and How it Provides Benefits to the Startups?, Techuz InfoWeb Private Limited, https://www.techuz.com/blog/what-is-micro-frontend-and-how-it-provide-benefits-to-the-startups/, last accessed Nov. 30, 2021, published Feb. 28, 2018.

Abdullah, Muhammad et al., "Unsupervised Learning Approach for Web Application Auto-Decomposition into Microservices", published in Journal of Systems and Software, Feb. 2019.

Chen, Xi, et al. "Meta-learning for multi-objective reinforcement learning." 2019 IEEE/RSJ International Conference on Intelligent Robots and Systems (IROS). IEEE, Oct. 7, 2019.

James, Steven, et al., "An analysis of monte carlo tree search." Thirty-First AAAI Conference on Artificial Intelligence, Feb. 2017.

Jaderberg, Max, et al. "Reinforcement learning with unsupervised auxiliary tasks." arXiv preprint arXiv:1611.05397 Nov. 16, 2016.

Van Moffaert, Kristof, et al. "Multi-objective reinforcement learning using sets of pareto dominating policies." The Journal of Machine Learning Research 15.1, Jan. 1, 2014, pp. 3483-3512.

Liang, Eric, et al. "RLlib: Abstractions for distributed reinforcement learning." International Conference on Machine Learning. PMLR, Jul. 3, 2018.

Yang, Runzhe, et al., "A generalized algorithm for multi-objective reinforcement learning and policy adaptation." arXiv preprint arXiv:1908.08342, Aug. 21, 2019.

Monte Carlo tree search, https://en.wikipedia.org/w/index.php?title=Monte_Carlo_tree_search&oldid=1050627850 (last visited Dec. 6, 2021.

Harms, Holger, Collin Rogowski, and Luigi Lo Iacono. "Guidelines for Adopting Frontend Architectures and Patterns in Microservices-based Systems." Proceedings of the 2017 11th Joint Meeting on Foundations of Software Engineering. 2017.

Amiri, Mohammad Javad. "Object-aware lidentification of Microservices." 2018 IEEE International Conference on Services Computing (SCC). IEEE, 2018.

Ren, Zhongshan, et al. "Migrating Web Applications from Monolithic Structure to Microservices Architecture." Proceedings of the Tenth Asia-Pacific Symposium on Internetware. 2018.

Jin, Wuxia, et al. "Functionality-oriented Microservice Extraction Based on Execution Trace Clustering." 2018 IEEE International Conference on Web Services (ICWS). IEEE, 2018.

Nunes, Luis, Nuno Santos, and Antonio Rito Silva. "From a Monolith to a Microservices Architecture: An Approach Based on Transactional Contexts." European Conference on Software Architecture. Springer, Cham, 2019.

Baresi, Luciano, Martin Garriga, and Alan De Renzis. "Microservices Identification Through Interface Analysis." European Conference on Service-Oriented and Cloud Computing. Springer, Cham, 2017.

Fritzsch, Jonas, et al. "From monolith to microservices: a classification of refactoring approaches." International Workshop on Software Engineering Aspects of Continuous Development and New Paradigms of Software Production and Deployment. Springer, Cham, 2018.

Desai U, Bandyopadhyay S, Tamilselvam S. Graph neural network to dilute outliers for refactoring monolith application. InProceedings of 35th AAAI Conference on Artificial Intelligence (AAAI'21) Feb. 7, 2021.

Bandyopadhyay S, Lokesh N, Murty MN. Outlier aware network embedding for attributed networks. In Proceedings of the AAAI conference on artificial intelligence Jul. 17, 2019 (vol. 33, No. 01, pp. 12-19).

Mell, Peter, et al., The NIST Definition of Cloud Computing, National Institute of Standards and Technology, U.S. Department of Commerce, NIST Special Publication 800-145, Sep. 2011.

(56) References Cited

OTHER PUBLICATIONS

Alexander Krause, "Microservice Decomposition via Static and Dynamic Analysis of the Monolith", May 19, 2020 IEEE (Year: 2020).

International Search Report and Written Opinion from International Application No. PCT/CN2022/124669, 9 pages, dated Dec. 15, 2022.

* cited by examiner

200

▶ com.ibmwebsphere.samples.daytrader.entities.OrderDataBean {4} name : com . ibm . websphere . samples . daytrader . entities . OrderDataBean

▶ usedClassesToCount {5}
- com . ibm . websphere . samples . daytrader . entities . HoldingDataBean : 1
- com . ibm . websphere . samples . daytrader . util . TradeConfig : 8
- com . ibm . websphere . samples . daytrader . entities . AccountDataBean : 1
- com . ibm . websphere . samples . daytrader . util . Log : 1
- com . ibm . websphere . samples . daytrader . entities . QuoteDataBean : 1

▶ usedbyClassesToCount {13}
- com . ibm . websphere . samples . daytrader . TradeServices : 1
- com . ibm . websphere . samples . daytrader . web . TradeBuildDB : 1
- com . ibm . websphere . samples . daytrader . web . prims . ejb3 . PingServlet2Session2CMR0ne2Many : 1
- com . ibm . websphere . samples . daytrader . web . jsf . QuoteJSF : 8
- com . ibm . websphere . samples . daytrader . ejb3 . TradeSLSBBean : 29
- com . ibm . websphere . samples . daytrader . ejb3 . DTBroker3MDB : 1
- com . ibm . websphere . samples . daytrader . direct . TradeDirect : 20
- com . ibm . websphere . samples . daytrader . web . TradeServLetAction : 1
- com . ibm . websphere . samples . daytrader . web . TradeAction : 3
- com . ibm . websphere . samples . daytrader . web . jsf . AccountDataJSF : 17
- com . ibm . websphere . samples . daytrader . web . jsf . PortfolioJSF : 8
- com . ibm . websphere . samples . daytrader . util . CompleteOrderThread : 1
- com . ibm . websphere . samples . daytrader . web . jsf . OrderDataJSF : 9

FIG. 2

| Structural Outliers | Attribute Outliers | Combined Outliers |
|---|---|---|
| PingWebSocketJson : 0.033 | KeyBlock : 0.035 | Log : 0.026 |
| MarketSummaryWebSocket : 0.031 | MDBStats : 0.027 | ActionMessage : 0.024 |
| TradeDirect : 0.030 | QuoteData : 0.026 | JsonMessage : 0.022 |
| TradeSLSBBean : 0.029 | Log : 0.024 | RunStatsDataBean : 0.020 |
| DTBroker3MDB : 0.027 | HoldingData : 0.023 | TradeConfig : 0.019 |

CONSTRAINTS-BASED REFACTORING OF MONOLITH APPLICATIONS THROUGH ATTRIBUTED GRAPH EMBEDDINGS

FIELD

The present application generally relates to information technology and, more particularly, to modernizing applications.

BACKGROUND

Organizations are increasingly attempting to refactor monolith application architectures into a microservice architecture as part of their journey to the cloud. Generally, refactoring a microservice architecture involves partitioning the software components into finer modules such that the development can happen independently. Microservice architectures provide natural benefits when deployed in the cloud since resources can be allocated dynamically to necessary components based on demand.

SUMMARY

In one embodiment of the present disclosure, techniques for refactoring of monolith applications through attributed graph embeddings are provided. An exemplary computer-implemented method can include performing an analysis of source code of a monolith application to identify one or more structural features and one or more behavioral features; generating a graph structure representing the monolith application based at least in part on the identified one or more structural features and the identified one or more behavioral features, wherein the graph structure comprises: a plurality of nodes, each node corresponding to one of a plurality of software modules of the monolith application, and a plurality of edges between the plurality nodes, each edge representing a relationship of the corresponding nodes; automatically identifying one or more constraints associated with the plurality of nodes in the graph structure based at least in part on the analysis of the source code; clustering the plurality of nodes into one or more clusters using a convolutional neural network based at least in part on the one or more identified constraints; and outputting, to a user, one or more candidate microservices for refactoring the monolith application, wherein each of the one or more candidate microservices corresponds to a respective one of the one or more clusters.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

BRIEF DESCRIPTION OF THE DRAWINGS

FIG. 2 is a diagram showing an example of inter-class usage information, according to an exemplary embodiment of the present disclosure;

FIG. 6B shows a table of outlier values for the clusters from FIG. 6A, according to an exemplary embodiment of the present disclosure;

DETAILED DESCRIPTION

Figure 1:
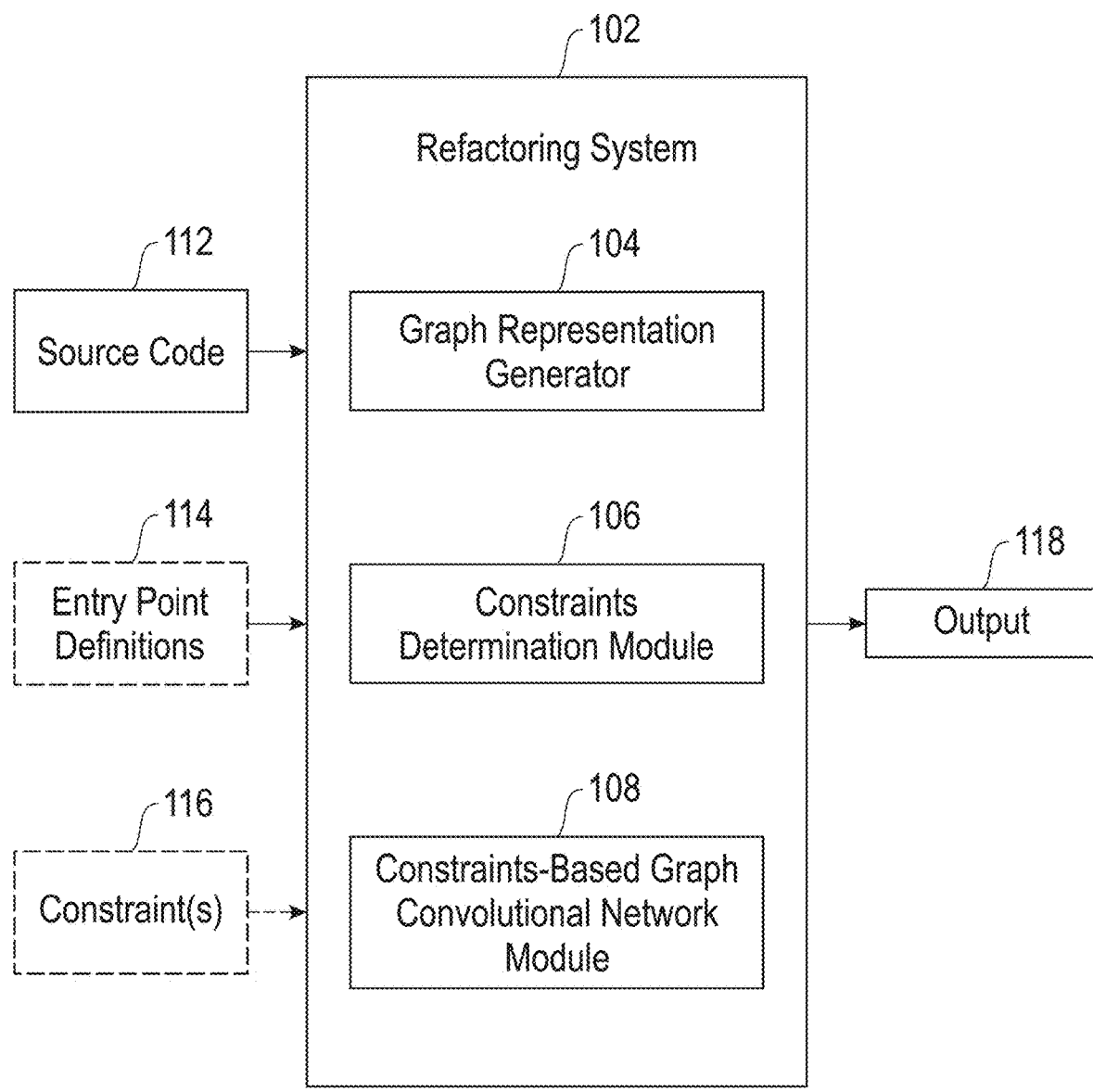
FIG. 1 is a diagram illustrating a system architecture, according to an exemplary embodiment of the present disclosure.

A monolith application generally refers to an application that is built as a single unit. For example, a monolith application may include a database, a client-side user interface, and a server-side application server, where all of the functions are managed and served in one place. Accordingly, monolith applications often have a large and complex code base. Developers making changes or updates to the application must access the same code base.

A microservice architecture breaks an application down into a plurality of microservices, where each microservice carries out a process of the application. The microservices can communicate with each other via application programming interfaces (APIs). In contrast to monolith architectures, each microservice can be updated or deployed independently.

Application refactoring is a process of rewriting one or more components of an application in order to make the application cloud enabled or convert the application from a monolith application to an application based on microservices, for example. However, developers might not be ready to provide access to the application runtime or share code due to a lack of available resources, for example. It is generally easier to define interfaces and identify bounded context when designing microservices, but refactoring applications that are already implemented makes it more difficult to understand the domain model boundaries. Additional challenges for refactoring include ranking the classes (or programs) of the application that need refactoring for ease of transition, infusing multiple core application artifacts for clustering, and determining metrics to drive a clustering decision and a corresponding objective function.

As described herein, an embodiment of the present disclosure includes techniques for applying a graph convolution network process to unify node representation, outlier node detection and dilution, and node clustering into the same framework for refactoring a monolith application. One or more embodiments perform constraints-based representation learning and clustering, where constraints are a mandatory element that are considered, and adhered to, during the refactoring process. Such constraints may include, for example: a constraint on the number of microservices (K clusters), a constraint relating to mandatory nodes that are to be included in the K microservices, and one or more constraints specific to at least one programming language or framework. The constraints on the number of microservices and the mandatory nodes, in some embodiments, may be inferred automatically (e.g., through a program analysis) and/or provided by a user. Constraints specific to programming languages and/or frameworks may be added manually by developers, and/or may be predefined. As a non-limiting example, a predefined constraint in Java may require a super class and its only subclass to be included in the same microservice.

As described in more detail herein, a monolith application may be partitioned into K clusters of classes, where each cluster is a group of classes that performs a well-defined functionality. The clusters should exhibit high cohesion (e.g., have strong interaction within the cluster) and low coupling (e.g., less interaction between clusters). Additionally, at least one embodiment includes identifying the following outlier classes: (i) a structural outlier classes and (ii) attribute outlier classes. Generally, a structural outlier class has high interaction with classes from different clusters, and an attribute outlier class includes attributes (e.g., usage patterns) that are similar to attributes from other clusters.

Additionally, some embodiments infuse structural, semantic, and behavioral features of the monolith application using static analysis. An attribute network is generated to perform constraints-based refactoring of the monolith application through attribute graph embeddings based on automated and/or manual constraints. The constraints may include, for example, a number of microservices, core members of such microservices, and membership requirements (e.g., whether two classes must be in the same microservice, or whether two classes must be in different microservices) of programs/resources that are learnt from user inputs and program analysis. The attribute network, in some embodiments, is used to recommend refactorable programs.

FIG. 1 shows a diagram illustrating a system architecture, according to an exemplary embodiment of the present disclosure. The FIG. 1 example includes a refactoring system 102 comprising a graph representation generator 104, a constraints determination module 106, and constraints-based graph convolutional network module 108. The refactoring system 102 obtains source code 112 corresponding to a monolith application, entry point definitions 114, and, optionally, one or more constraints 116 as input. Generally, the graph representation generator 104 generates a graph structure representation of the monolith application based on a static analysis of the source code 112. Additionally, the constraints determination module 106 automatically determines one or more constraints based on the inputs 112 and 114, in addition to the constraints 116 provided by a user, for example. The constraints-based graph convolutional network module 108 performs constraints-based representation learning and clustering while adhering to the constraints determined by module 108. The refactoring system 102 generates output 118 for a user related to refactoring the monolith application. As described in more detail elsewhere herein, the output 118 may include at least one of: a set of candidate microservices that are determined by the constraints-based graph convolutional network module 108, recommendations to modify one or more parts of the monolith application for refactoring the monolith application, or the set of outlier nodes corresponding to refactorable programs.

At least one embodiment includes generating a graph representation of a monolith application, wherein the generated graph includes: nodes representing program elements (such as, for example, classes in the monolith application) and edges representing structural dependencies between the nodes. For example, if a function from Class A calls Class B, then an edge between the node corresponding to Class A and the node corresponding to Class B is created. Optionally, the graph may include node attributes for one or more of the nodes that represent additional information about the program elements of the corresponding node. By way of example, the attributes may include a uniform resource identifier (URI) for the class, call graphs involving the class, and CRUD (create, read, update, and delete) operations associated with the class.

It is noted that a graph representation is a natural choice for capturing detailed structure of a monolith application. For example, each software entity can be represented as a node and its dependencies with other entities as links (or edges). Additionally, many of the insights from the application artifacts are natural candidates for graph representation.

For example, for interclass dependency (ICU), a graph may include nodes representing a class, table, or user interface elements, and the edge represents the direct dependence (e.g., method, table calls). For path class cooccurrence (PCC), the nodes of the graph can represent a class, a table, or user interface elements, and the call flow (e.g., method, table calls) is represented as an edge but abstracted at class level. For affinity (AF), nodes may represent a class or table and a semantic affinity between the node and other classes or tables (e.g., methods or table calls) are represented using a distance measure as edges, but abstracted at a class level. For transactions (TR), the nodes may represent a class or a table, and the data access pattern type link based on call flow with other classes or tables (e.g., method or table calls) may be identified as an edge. Again, the information is abstracted at class level. Such insights can be broken into four graphs for the four different CRUD operations. This is a subset of PCC, but it is called out separately since, for microservices, the update operation is relatively less important than the other CRUD operations.

In at least one embodiment, the graph representation is initially generated using ICU, and other features are overlaid as properties to the nodes in the graph. As such, the refactoring problem can be viewed as a graph-based clustering task.

One or more embodiments include constructing an objective function associated with a graph convolutional network (GCN) decoder-encoder based on an adjacency matrix, A, and a node attribute matrix, X, of the graph representation, G, for the monolith application. The graph representation may be expressed in terms of a set of nodes, V; a set of edges, E; and the attribute matrix, X.

More specifically, let $A \in \mathbb{R}^{|V| \times |V|}$ denote the adjacency matrix, where $A_{ij}$ is the weight of the edge $e_{ij}$ if it exists, otherwise $A_{ij}=0$. The GCN encoder is used to obtain a representation of each node as shown below:

$$Z = f(X, A) = \text{ReLU}(\hat{A}\ \text{ReLU}(\hat{A}XW^{(0)})W^{(1)}) \quad (1)$$

In equation 1, each row of $Z \in \mathbb{R}^{|V| \times F'}$ contains the corresponding node representation, and $\tilde{A}$ is computed as $A+I$, where $I \in \mathbb{R}^{|V| \times |V|}$ is the identity matrix, and the degree diagonal matrix is computed as $\tilde{D}_{ii}$ as $\Sigma_{j \in V} \tilde{A}_{ij}$, $\forall i \in V$. Additionally, $\hat{A}$ is set to $\tilde{D}^{-1/2}\tilde{A}\tilde{D}^{-1/2}$. It is noted that $W^{(0)}$ and $W^{(1)}$ are trainable parameter matrices of the GCN encoder.

The following GCN decoder is used to map the $F'$ dimensional node embedding to the input feature space:

$$\hat{X} = f(Z, A) = \text{ReLU}(\hat{A}\ \text{ReLU}(\hat{A}AW^{(2)})W^{(3)}) \quad (2)$$

In equation (2), $\hat{X} \in \mathbb{R}^F$, and $W^{(2)}$ and $W^{(3)}$ are trainable parameters of the decoder. Let $W=\{W^{(0)} \ldots W^{(3)}\}$ denote the parameters of the encoder and decoder combined. Additionally, structural and attribute outlierness (positive scalars) are denoted by $O_{si}$ and $O_{ai}$, respectively, for each node $i \in V$.

A loss component, which needs to be minimized with respect to the parameters of GCN and structural outlierness of the nodes, is as follows:

$$\mathcal{L}_{str} = \sum_{i \in V} \log\left(\frac{1}{O_{si}}\right) \|A_{i:} - Z_{i:}^T Z\|_2^2 \quad (3)$$

Here, $A_{i:}$ is the ith row of the adjacency matrix, and $Z_{i:}$ is the ith row (embedding of node i) of the node representation matrix.

The following equation reduces the contribution of the node attributes of attribute outliers in the attribute reconstruction loss:

$$\mathcal{L}_{att} = \sum_{i \in V} \log\left(\frac{1}{O_{ai}}\right) \|X_{i:} - \hat{X}_{i:}\|_2^2 \quad (4)$$

In equation (4), $X$ and $\hat{X}$ are the given and reconstructed node feature matrices. Minimizing the loss components in equations (3) and (4) with respect to the parameters of GCN and outlier scores provides unsupervised node embeddings. This will also detect the outlier nodes while minimizing their negative impact on the other nodes of the graph.

The following loss is used to cluster the node in the graph (assuming their embedding are already given):

$$\mathcal{L}_{clus} = \sum_{i=1}^{N}\sum_{k=1}^{K} M_{ik}\|Z_{i:} - C_k\|_2^2 \quad (5)$$

In equation (5), $M \in \{0,1\}^{|V| \times K}$ is the binary cluster assignment matrix, where $K$ is the number of clusters, and $M_{ik}=1$ if node $i$ belongs to the kth cluster and $M_{ik}=0$ otherwise, and $C_k \in \mathbb{R}^{F'}$ is the center of each cluster in the embedding space.

Additionally, the following loss is used to factor in one or more constraints when performing the clustering, as explained in more detail elsewhere herein:

$$\mathcal{L}_{seed} = \sqrt{\sum_{i \in seeds}\sum_{j \in seeds} \|Z_i - Z_j\|_2^2} \quad (6)$$

The joint loss function is as follows:

$$\min_{W,O,M,C} \mathcal{L}_{total} = \alpha_1 \mathcal{L}_{str} + \alpha_2 \mathcal{L}_{att} + \alpha_3 \mathcal{L}_{clus} - \alpha_4 \mathcal{L}_{seed} \quad (7)$$

$$\text{such that,} \sum_{i \in V} O_{si} = \sum_{i \in V} O_{ai} = 1 \quad (8)$$

$$M \in \{0,1\}^{|V| \times K}, O_{si}, O_{ai} > 0\ \forall\ i \in V \quad (9)$$

It is noted that, in the combined objective function, both node embedding and clustering will affect each other. Hence, in one or more embodiments, the algorithm is an integrated solution instead of a decoupled one. Further, one or more embodiments use gradient based alternative minimization, along with the k-means algorithm, to solve the combined objective function. If instead of an exact number of clusters, $K$, only a rough estimate, $K_o$, is known, $K$ can be varied around $K_o$, and an extra loss component can be added as $(K-K_o)^2$ to the combined loss to penalize deviations from $K_o$.

The following equations may be used to calculate $O_{si}$ and $O_{ai}$:

$$O_{si} = \frac{\|A_{i:} - Z_{i:}^T Z\|_2^2}{\sum_{j \in V}\|A_{j:} - Z_{j:}^T Z\|_2^2} \quad (9)$$

$$O_{ai} = \frac{\|X_{i:} - \hat{X}_{i:}\|_2^2}{\sum_{j \in V}\|X_{j:} - \hat{X}_{j:}\|_2^2} \quad (10)$$

The total loss also involves clustering parameters $M$ and $C$. While all other variables to be fixed, the cluster assignment matrix, $M$, can be obtained as:

$$M(i, k) = \begin{cases} 1, & \text{if } k = \operatorname*{argmin}_{k' \in \{1, \ldots, K\}} \|Z_i - C_{k'}\|_2^2 \\ 0, & \text{otherwise} \end{cases} \quad (11)$$

In the next step, the kth row of cluster center matrix $C$ can be obtained as:

$$C_k = \frac{1}{N_k} \sum_{i \in C_k} Z_{i:} \quad (12)$$

In equation (12), $C_k = \{i \in V | M_{ik}=1\}$ is kth cluster and $N_k = |C_k|$ is the size of the kth cluster.

Accordingly, the constraints-based clustering and outlier aware graph convolution network (CO-GCN), in some embodiments, may be based on the following algorithm:

1. Inputs: Class dependencies, entry points, seed constraints;
2. Convert the application to a graph representation to obtain V, E, and X.
3. Initialize outlier scores $O_{si}$ and $O_{ai}$ uniformly, $\forall i \in V$.

-continued

4. Pre-train the GCN encoder and decoder.
5. Use constrained k-means++ to initialize the cluster assignment.
6. For T iterations do:
7.     Update outlier score$\mathcal{O}$ ;
8.     Update cluster assignment and center matrices with constraints;
9.     Update the parameters of GCN encoder and decoder by minimizing equation (7);
10. end for
11. Output: cluster assignment matrix M, cluster center matrix C, and the outlier score$\mathcal{O}$ .

Step 7 of the above algorithm may be performed using an optimization technique, such as, for example, ADAM to minimize equation (7). As noted above, in some situations only a rough estimate, $K_0$, is known. In such situations, $K_0$ may be obtained in different ways. For example, in some embodiments, obtaining $K_0$ includes automatically detecting the number of service entries (e.g., web APIs exposed by the application), which may also be the starting point for the call graph information extracted based on the static code analysis. $K_0$ may be obtained based on input from a user on the approximate number of microservices they desire for in the refactor application, and/or inferred from other project artifacts such as the project description or UML diagram, as non-limiting examples. For example, a product description may include the following "The application allows user to login, view their portfolio, lookup stock quotes, and buy or sell stock shares." Based on this, a user may infer there five candidate microservices are needed for this application.

Accordingly, K (either learnt or provided by user) is an example of one constraint that influences both clustering and the graph representations through the loss function. Additional constraints may include constraints that are specific to a programming language or a framework (e.g., in Java), constraints requiring certain core member microservices, and/or constraints for inclusion or exclusion of nodes in specific clusters. Accordingly, one or more embodiments provide a generic framework to allow a user to input such constraints, as needed.

Referring now to FIG. 2, this figure shows an example of inter-class usage information, according to an exemplary embodiment of the present disclosure. In this example, the inter-class usage information 200 is determined for an online stock trading monolith application called DayTrader. The application allows users to setup a trading platform by, for example, configuring a database, user account, and trading amount. Once setup the platform allows users to view market summary, check stock quotes, and buy or sell stocks. More specifically, the inter-class usage information 200 corresponds to an OrderDataBean entity of the DayTrader application, and shows the inter-classes usage information 202 related to classes that use the OrderDataBean entity and shows the inter-classes usage information 204 related to classes that are used by OrderDataBean.

Figure 3:
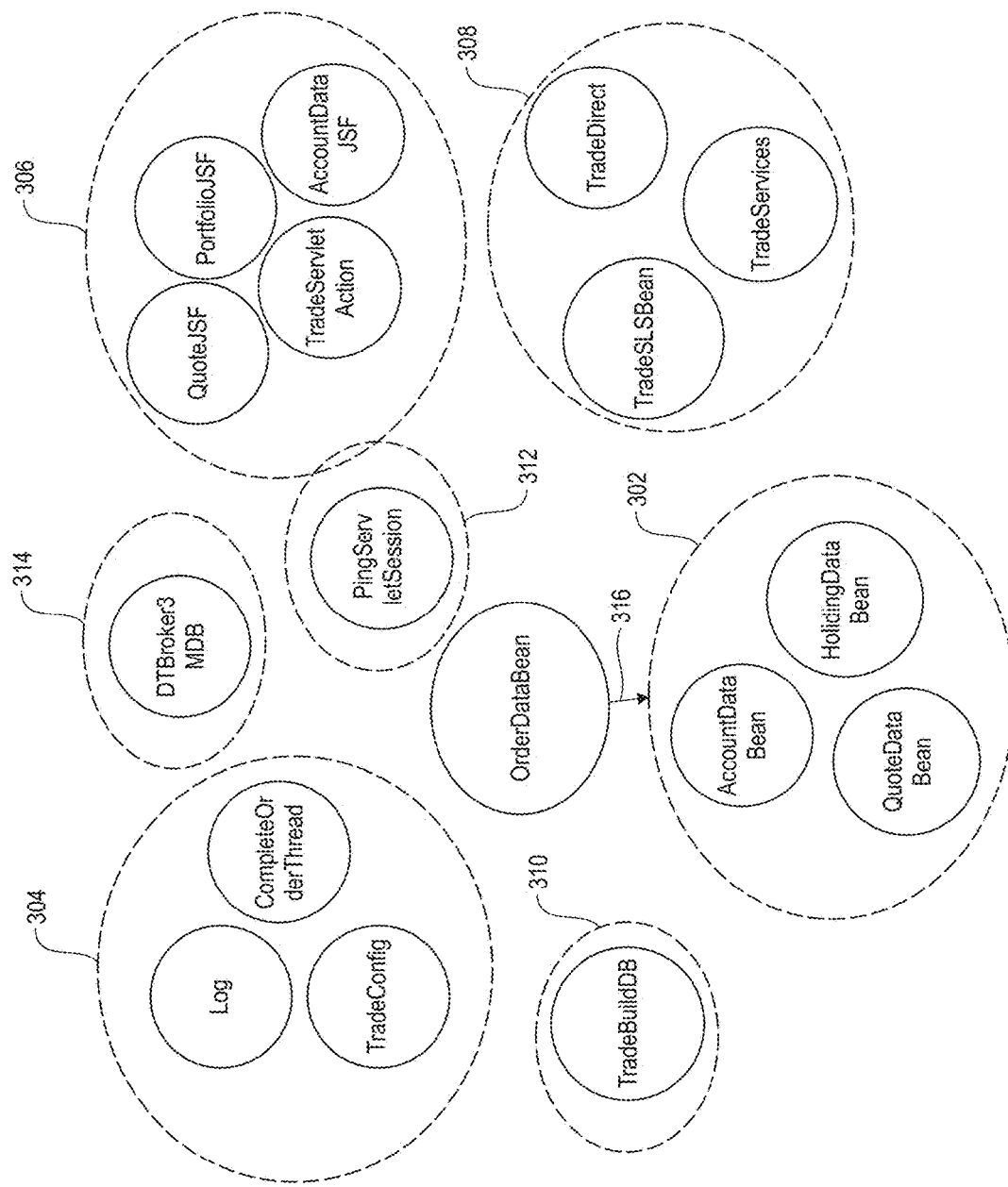
FIG. 3 is a diagram illustrating an example of a graph of classes of a monolith application, according to an exemplary embodiment of the present disclosure.

FIG. 3 is a diagram illustrating an example of a graph showing structural relationships of a monolith application, according to an exemplary embodiment of the present disclosure. Each node in the graph corresponds to a different one of the classes included in the inter-class usage information 200 in FIG. 2. The graph shows the structural relationship of OrderDataBean with respect to the other classes. More specifically, the graph in the FIG. 3 example shows different clusters or communities (using the dashed ovals 302-314) with respect to technology groups related to the OrderDataBean node. The URI path for the OrderDataBean class is "com.ibmwebsphere.samples.daytrader.entities.OrderDataBean" as indicated by the inter-class usage information 200. Accordingly, OrderDataBean may be considered to be part of the bean technology group 302, as indicated by arrow 316. However, the inter-class usage information 200 indicates that OrderDataBean also has links with other communities, including the JSF community 306, for example. Accordingly, OrderDataBean may be assigned a structural outlier score based on the interactions with other communities. Nodes having high outlier scores often correspond to controllers/servlets, which are large files that tend to handle UI data or perform business logic with the help of various utilities, for example. One or more embodiments help identify the most impactful outliers, which then can be used to identify the various communities. For example, one or more embodiments may seed the size of community based on the unique URI paths, which typically tend to be an approximate of the number of domains involved in the application.

Figure 4:
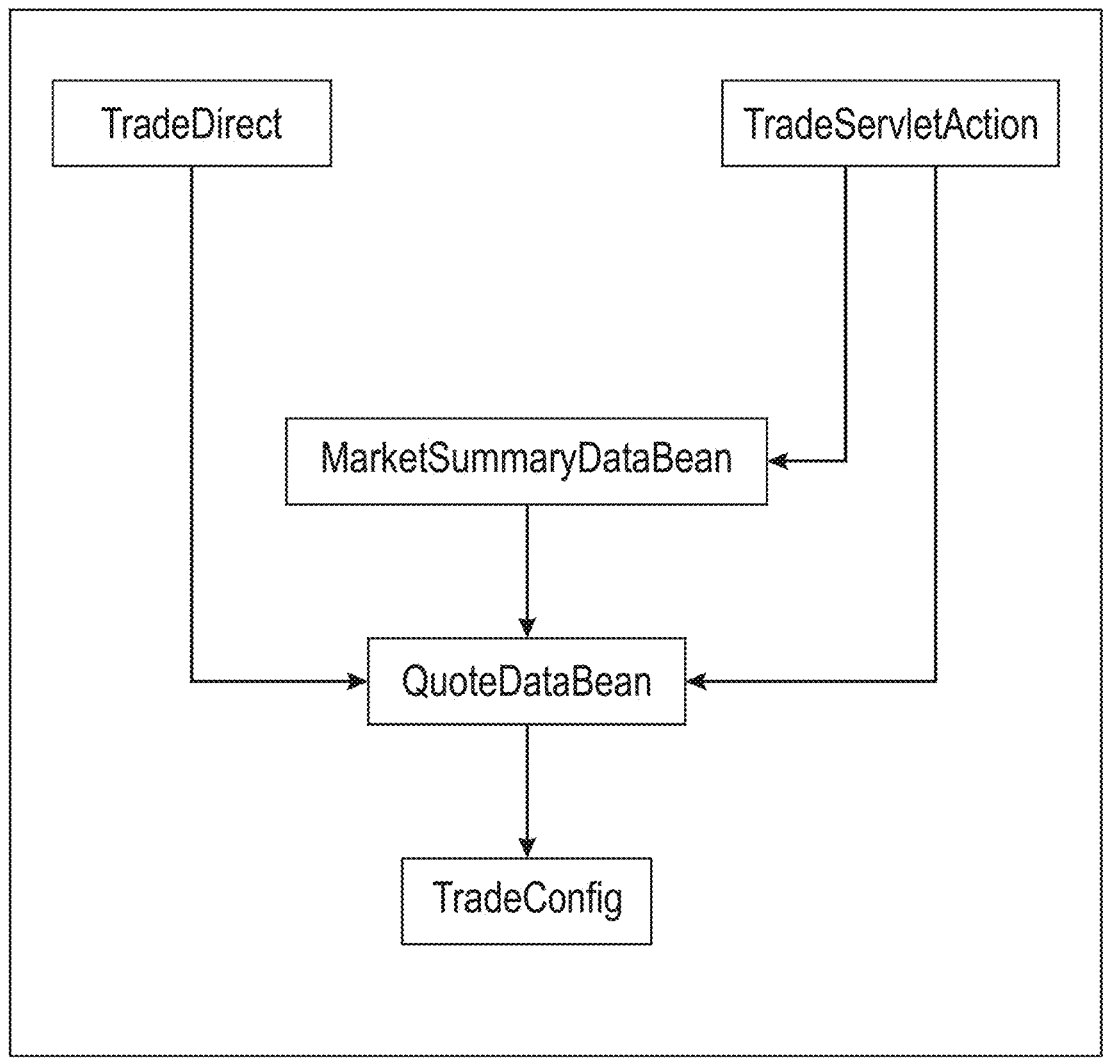
FIG. 4 is a diagram illustrating an example of a portion of a call graph according to an exemplary embodiment of the present disclosure.

FIG. 4 shows a diagram illustrating an example of a portion of a call graph 400 according to an exemplary embodiment of the present disclosure. Similar to FIGS. 2-3, the call graph 400 also corresponds to the DayTrader application.

Figure 5:
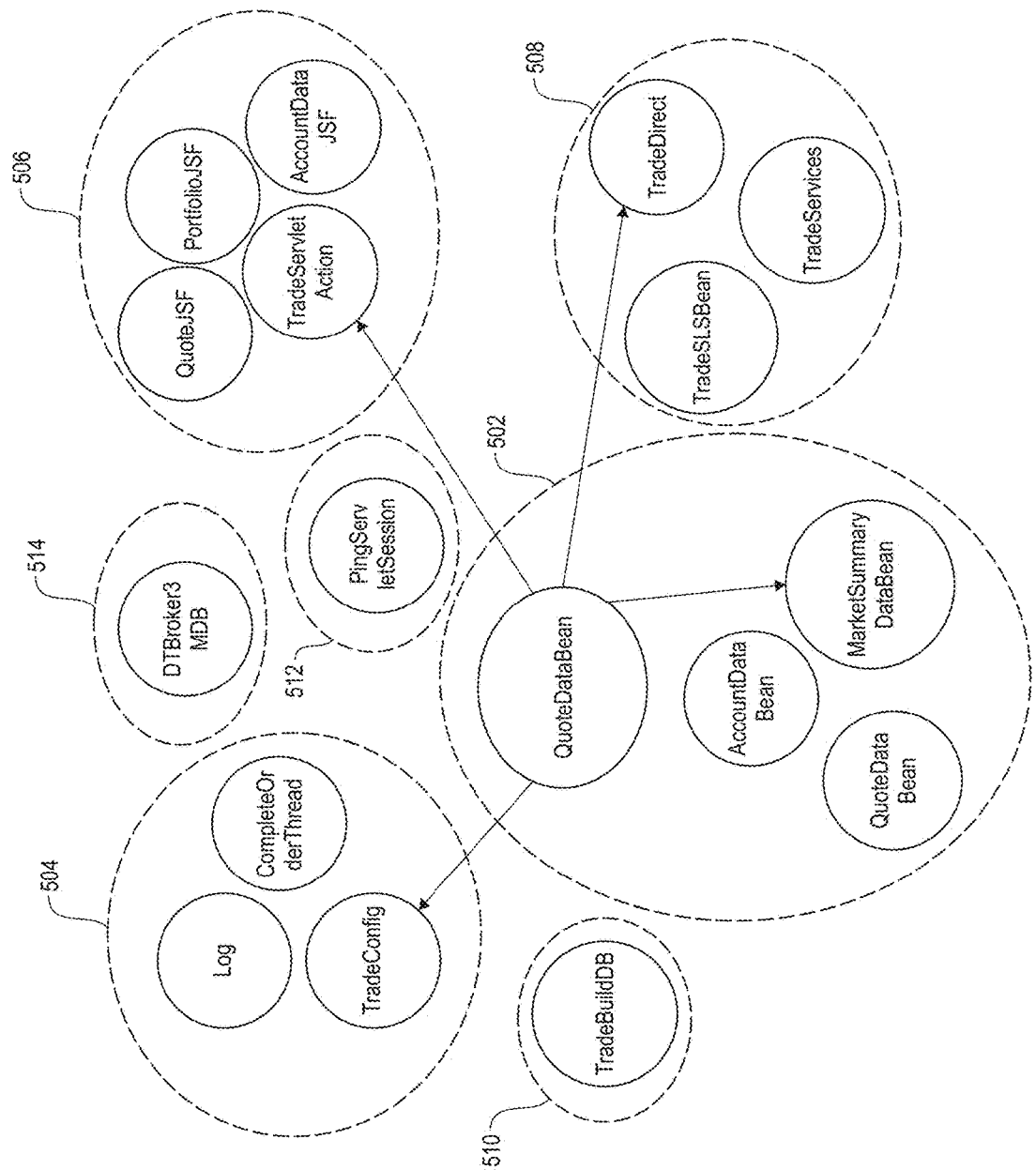
FIG. 5 is a diagram illustrating another example of a graph of classes of a monolith application, according to an exemplary embodiment of the present disclosure.

Referring also to FIG. 5, this figure shows another example of a graph, according to an exemplary embodiment of the present disclosure. The graph in FIG. 5 includes nodes corresponding to the call graph 400.

The monolith graph also shows clusters or communities (using dashed ovals 502-514) corresponding to different technology groups with respect to the QuoteDataBean node. The arrows from the QuoteDataBean node represent the connections from the call graph 400. According to some embodiments, the QuoteDataBean is considered an attribute outlier as the call graph information indicates the usage patterns are similar to usage patterns to nodes in one or more of other groups 504-514, for example.

Figure 6A:
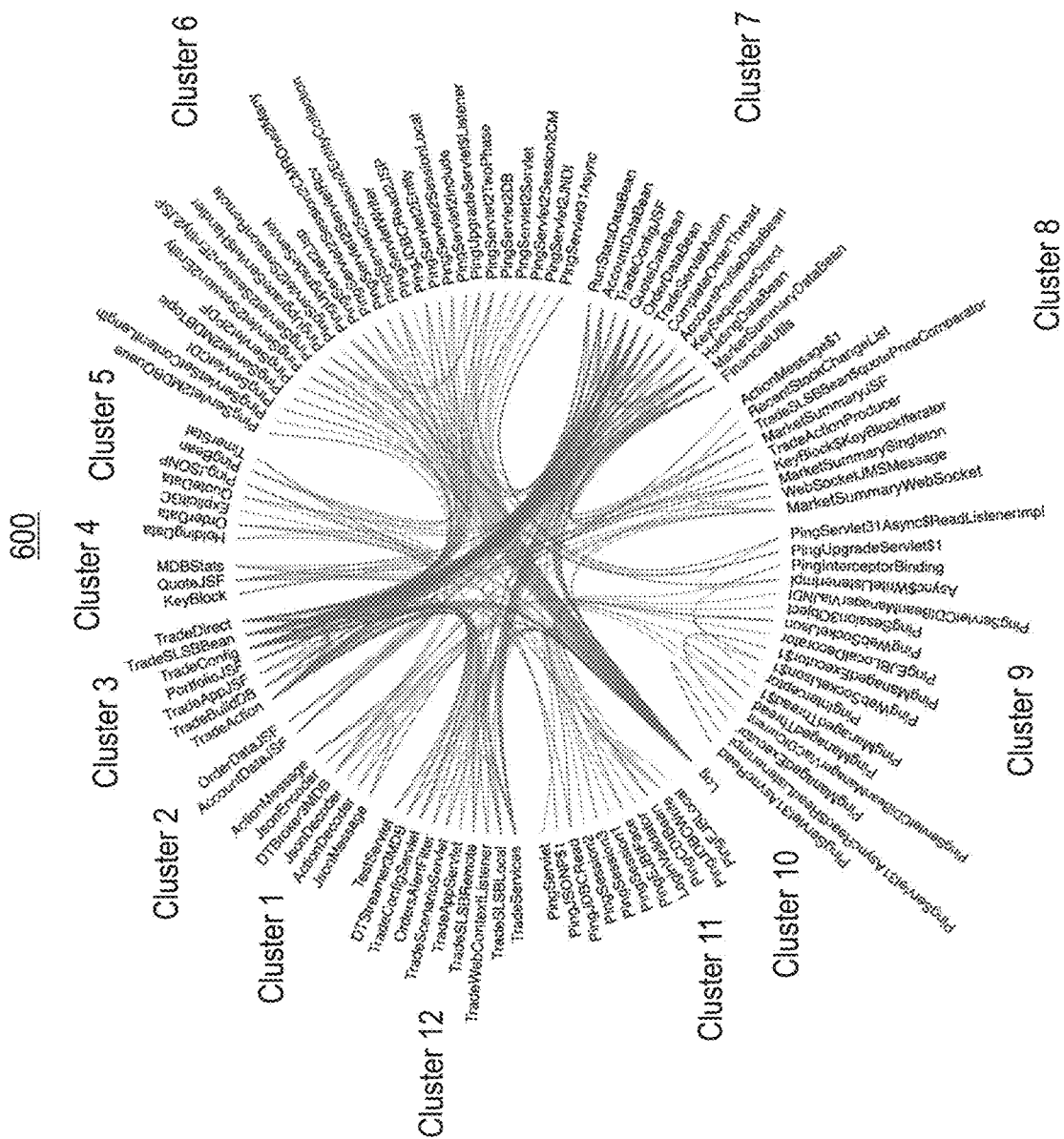
FIG. 6A shows a diagram showing different clusters of a monolith application.

FIG. 6A shows is a diagram showing different clusters of a monolith application; and FIG. 6B shows a table of outlier values for the clusters from FIG. 6A, according to an exemplary embodiment of the present disclosure. More specifically, the diagram 600 in FIG. 6A shows twelve clusters corresponding to the DayTrader application determined based on the outlier-aware graph embeddings, as described in more detail elsewhere herein. FIG. 6B shows a table 610 of the top structural outliers, attribute outliers, and combined outliers within the twelve clusters. The outliers are based on the outliers scores calculated in accordance with the constraints based CO-GCN algorithm described above.

Figure 7:
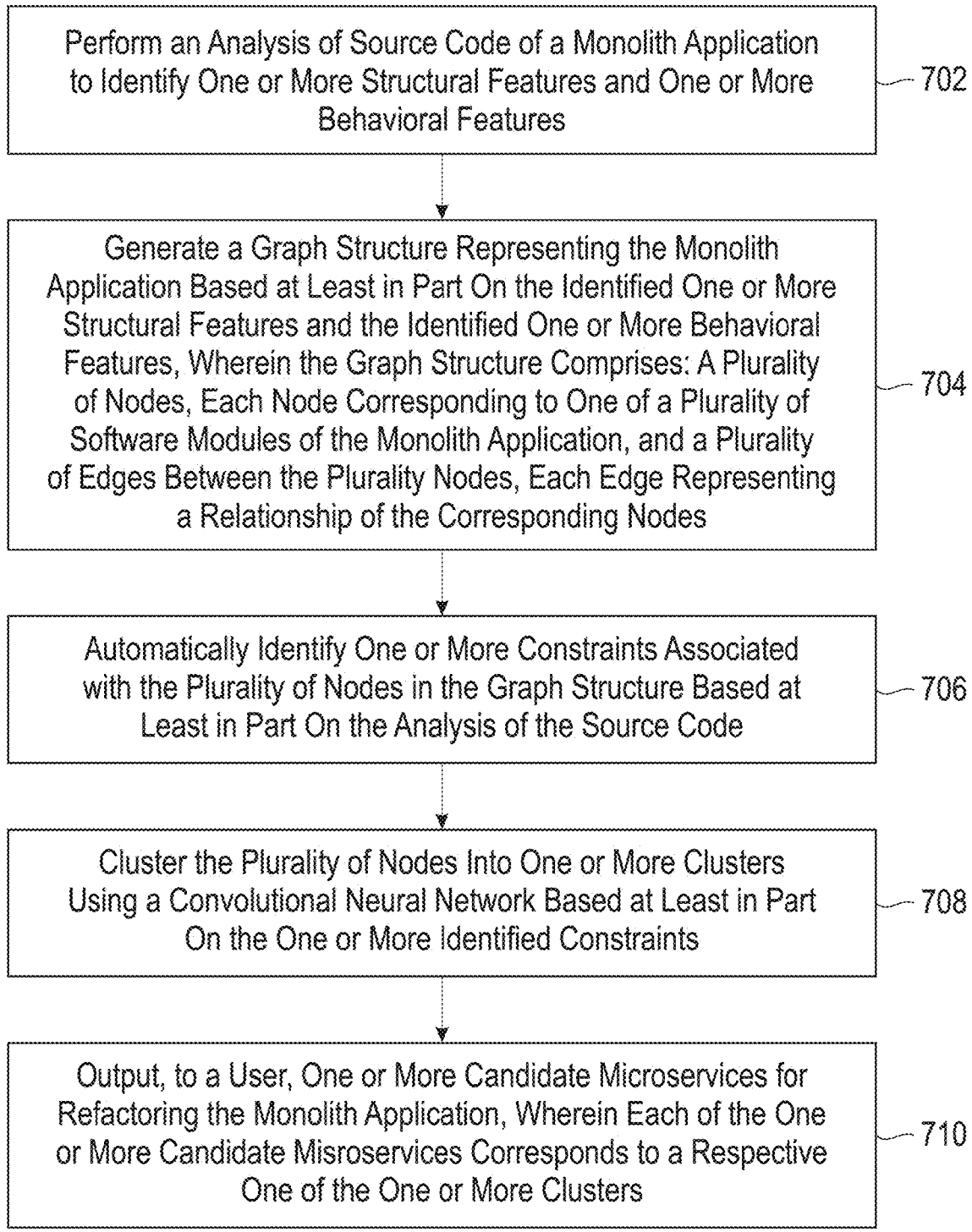
FIG. 7 is a flow diagram illustrating techniques according to an embodiment of the present disclosure.

FIG. 7 is a flow diagram illustrating techniques for constraints-based refactoring of a monolith application according to an embodiment of the present disclosure.

Step 702 includes performing an analysis of source code of a monolith application to identify one or more structural features and one or more behavioral features.

Step 704 includes generating a graph structure representing the monolith application based at least in part on the identified one or more structural features and the identified one or more behavioral features, wherein the graph structure comprises: a plurality of nodes, each node corresponding to one of a plurality of software modules of the monolith application, and a plurality of edges between the plurality nodes, each edge representing a relationship of the corresponding nodes.

Step 706 includes automatically identifying one or more constraints associated with the plurality of nodes in the graph structure based at least in part on the analysis of the source code.

Step 708 includes clustering the plurality of nodes into one or more clusters using a convolutional neural network based at least in part on the one or more identified constraints.

Step 710 includes outputting, to a user, one or more candidate microservices for refactoring the monolith application, wherein each of the one or more candidate microservices corresponds to a respective one of the one or more clusters.

The one or more structural features may include one or more interclass dependencies associated with the plurality of software modules. The one or more behavioral features may include at least one of: a call graph of the monolith application; and interclass usage information associated with the plurality of software modules. The analysis may include identifying one or more entry points of the software application; and extracting the call graph based on the identified set of entry points. The one or more constraints may include at least one of: a constraint on a number of clusters that result from said clustering; one or more cluster inclusion constraints, wherein each of the cluster inclusion constraints require at least two of the plurality of software modules be included in a same one of the one or more clusters; one or more cluster exclusion constraints, wherein each of the cluster exclusion constraints require at least two of the plurality of software modules be included in different ones of the one or more clusters; and a constraint that requires a core set of software modules of the monolith application to be included in the one or more clusters. The techniques depicted in FIG. 7 may include a step of: determining one or more of the plurality of nodes in the graph structure are outliers based on at least one of the identified one or more structural features and the identified one or more behavioral features, wherein the convolutional neural network accounts for the one or more outlier nodes in the clustering. Additionally, the steps may include generating a recommendation to modify at least a portion of the one or more outlier nodes for refactoring the monolith application; and outputting the recommendation to the user. In some embodiments, the steps include obtaining, from the user, at least one additional constraint, wherein the at least one additional constraint is specific to at least one of: one or more software frameworks and one more computer programming languages. The analysis may include a static source code analysis.

The techniques depicted in FIG. 7 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 8:
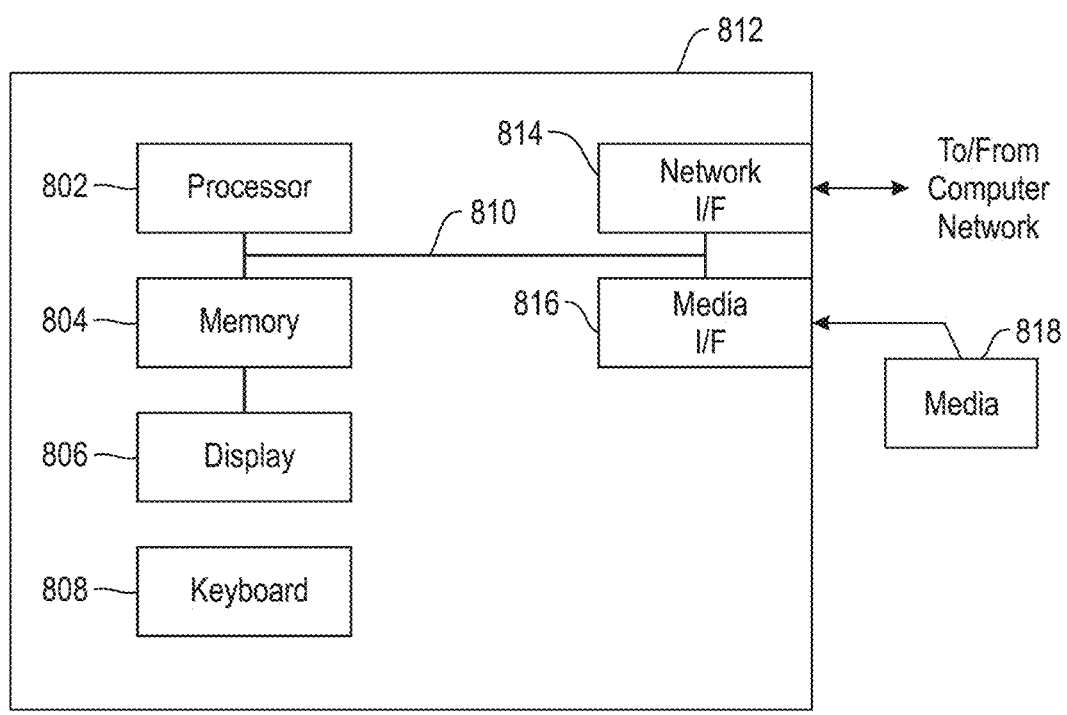
FIG. 8 is a system diagram of an exemplary computer system on which at least one embodiment of the present disclosure can be implemented.

Additionally, an embodiment of the present invention can make use of software running on a computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
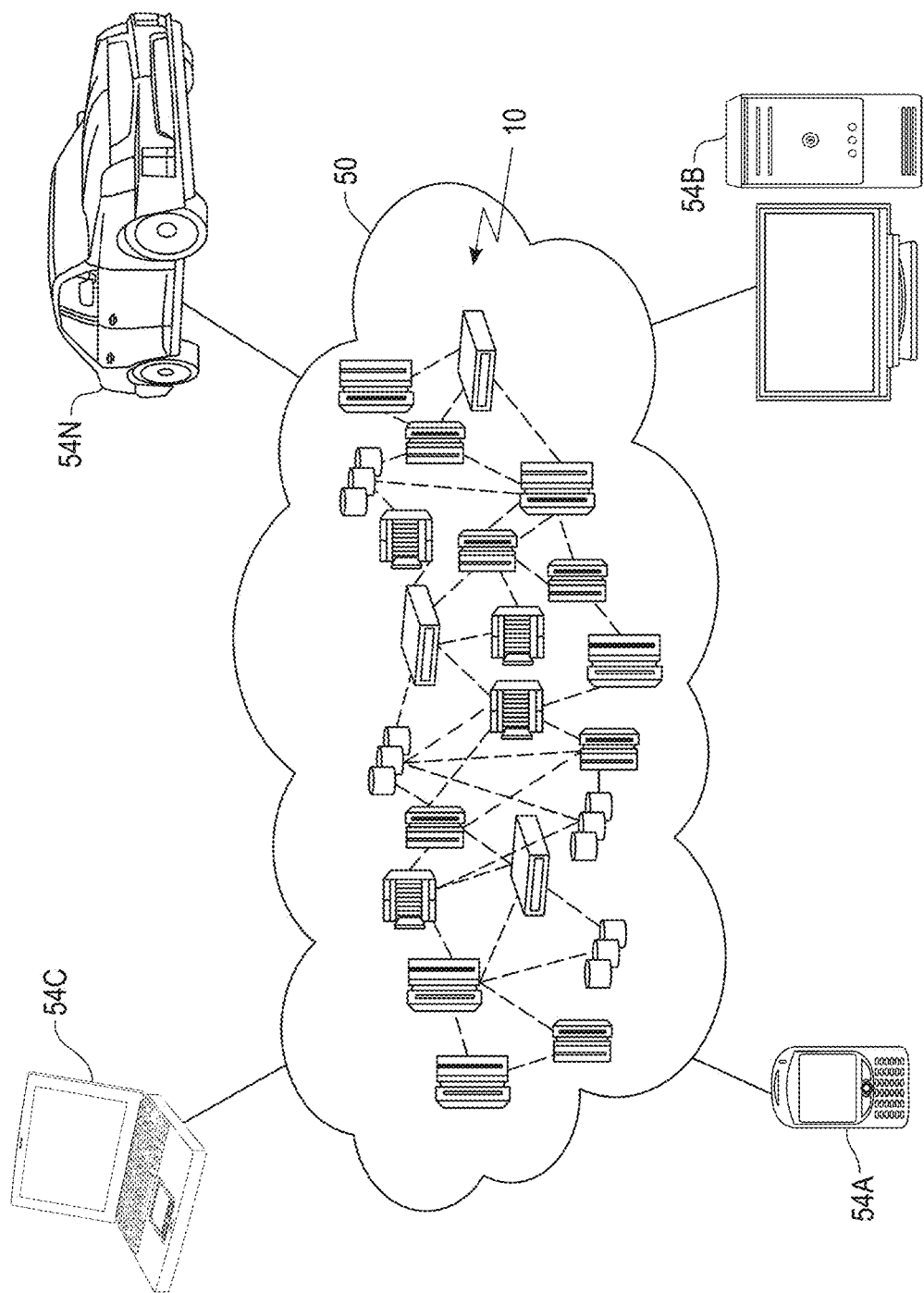
FIG. 9 depicts a cloud computing environment according to an embodiment of the present disclosure.

Referring now to FIG. 9, illustrative cloud computing environment 50 is depicted. As shown, cloud computing environment 50 includes one or more cloud computing nodes 10 with which local computing devices used by cloud consumers, such as, e.g., personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
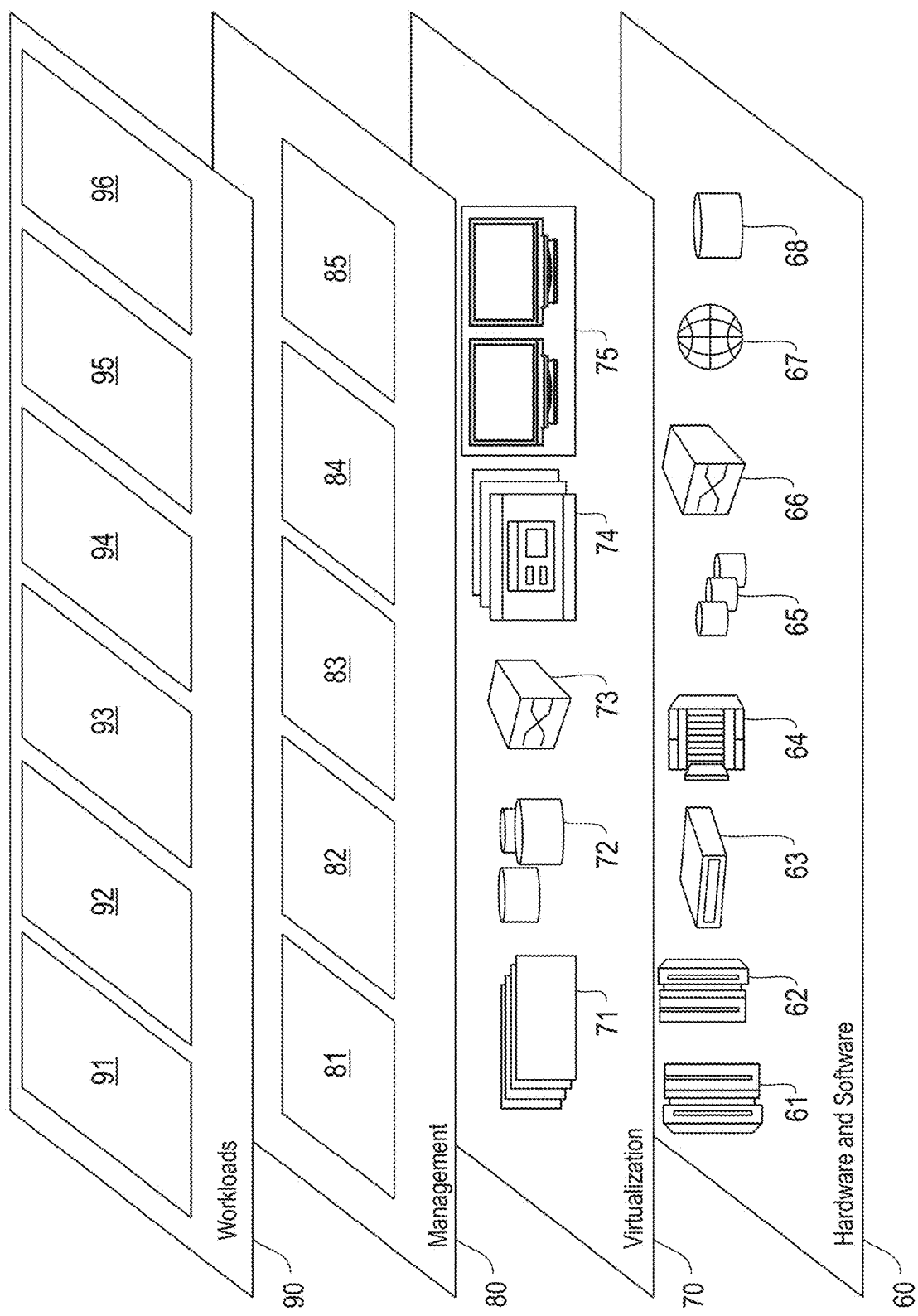
FIG. 10 depicts abstraction model layers according to an embodiment of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and refactoring applications 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide beneficial effects including, for example, one or more of modernizing applications using constraints-based refactoring and generating recommendations to modify one or more parts of a monolith application for converting the application to a microservice architecture.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    performing an analysis of source code of a monolith application to identify one or more structural features and one or more behavioral features;
    generating a graph structure representing the monolith application based at least in part on the identified one or more structural features and the identified one or more behavioral features, wherein the graph structure comprises: a plurality of nodes, each node corresponding to one of a plurality of software modules of the monolith application, and a plurality of edges between the plurality nodes, each edge representing a relationship of the corresponding nodes;
    automatically identifying one or more constraints associated with the plurality of nodes in the graph structure based at least in part on the analysis of the source code;
    training a graph convolutional neural network at least in part by updating a set of trainable parameters of the graph convolutional neural network over one or more iterations by jointly reducing multiple loss values, wherein at least one of the multiple loss values is associated with the one or more identified constraints;
    using the graph convolutional neural network to cluster the plurality of nodes into one or more clusters;
    determining one or more candidate microservices, wherein each of the one or more candidate microservices corresponds to a respective one of the one or more clusters; and
    modifying one or more parts of the monolith application based on at least a portion of the one or more determined candidate microservices;
    wherein the method is carried out by at least one computing device.

2. The computer-implemented method of claim 1, wherein the one or more structural features comprise one or more interclass dependencies associated with the plurality of software modules.

3. The computer-implemented method of claim 1, wherein the one or more behavioral features comprises at least one of:
   a call graph of the monolith application; and
   interclass usage information associated with the plurality of software modules.

4. The computer-implemented method of claim 3, wherein said analysis comprises:
   identifying one or more entry points of the software application; and
   extracting the call graph based on the identified set of entry points.

5. The computer-implemented method of claim 1, wherein the one or more constraints comprise at least one of:
   a constraint on a number of clusters that result from said clustering;
   one or more cluster inclusion constraints, wherein each of the cluster inclusion constraints require at least two of the plurality of software modules be included in a same one of the one or more clusters;
   one or more cluster exclusion constraints, wherein each of the cluster exclusion constraints require at least two of the plurality of software modules be included in different ones of the one or more clusters; and
   a constraint that requires a core set of software modules of the monolith application to be included in the one or more clusters.

6. The computer-implemented method of claim 1, comprising:
   determining one or more of the plurality of nodes in the graph structure are outliers based on at least one of the identified one or more structural features and the identified one or more behavioral features, wherein the graph convolutional neural network accounts for the one or more outlier nodes in the clustering.

7. The computer-implemented method of claim 6, comprising:
   generating a recommendation to modify at least a portion of the one or more outlier nodes for refactoring the monolith application; and
   outputting the recommendation to the user.

8. The computer-implemented method of claim 1, comprising:
   obtaining, from the user, at least one additional constraint, wherein the at least one additional constraint is specific to at least one of: one or more software frameworks and one or more computer programming languages.

9. The computer-implemented method of claim 1, wherein the analysis comprises a static source code analysis.

10. A computer program product comprising a computer readable storage medium having program instructions embodied therewith, the program instructions executable by a computing device to cause the computing device to:
    perform an analysis of source code of a monolith application to identify one or more structural features and one or more behavioral features;
    generate a graph structure representing the monolith application based at least in part on the identified one or more structural features and the identified one or more behavioral features, wherein the graph structure comprises: a plurality of nodes, each node corresponding to one of a plurality of software modules of the monolith application, and a plurality of edges between the plurality nodes, each edge representing a relationship of the corresponding nodes;
    automatically identify one or more constraints associated with the plurality of nodes in the graph structure based at least in part on the analysis of the source code;
    train a graph convolutional neural network at least in part by updating a set of trainable parameters of the graph convolutional neural network over one or more iterations by jointly reducing multiple loss values, wherein at least one of the multiple loss values is associated with the one or more identified constraints;
    use the graph convolutional neural network to cluster the plurality of nodes into one or more clusters;
    determine one or more candidate microservices, wherein each of the one or more candidate microservices corresponds to a respective one of the one or more clusters; and
    modify one or more parts of the monolith application based on at least a portion of the one or more determined candidate microservices.

11. The computer program product of claim 10, wherein the one or more structural features comprise one or more interclass dependencies associated with the plurality of software modules.

12. The computer program product of claim 10, wherein the one or more behavioral features comprises at least one of:
    a call graph of the monolith application; and
    interclass usage information associated with the plurality of software modules.

13. The computer program product of claim 12, wherein said analysis comprises:
    identifying one or more entry points of the software application; and
    extracting the call graph based on the identified set of entry points.

14. The computer program product of claim 10, wherein the one or more constraints comprise at least one of:
    a constraint on a number of clusters that result from said clustering;
    one or more cluster inclusion constraints, wherein each of the cluster inclusion constraints require at least two of the plurality of software modules be included in a same one of the one or more clusters;
    one or more cluster exclusion constraints, wherein each of the cluster exclusion constraints require at least two of the plurality of software modules be included in different ones of the one or more clusters; and
    a constraint that requires a core set of software modules of the monolith application to be included in the one or more clusters.

15. The computer program product of claim 10, wherein the program instructions executable by a computing device cause the computing device to:
    determine one or more of the plurality of nodes in the graph structure are outliers based on at least one of the identified one or more structural features and the identified one or more behavioral features, wherein the graph convolutional neural network accounts for the one or more outlier nodes in the clustering.

16. The computer program product of claim 15, wherein the program instructions executable by a computing device cause the computing device to:
    generate a recommendation to modify at least a portion of the one or more outlier nodes for refactoring the monolith application; and
    output the recommendation to the user.

17. The computer program product of claim 10, wherein the program instructions executable by a computing device cause the computing device to:

obtain, from the user, at least one additional constraint, wherein the at least one additional constraint is specific to at least one of: one or more software frameworks and one or more computer programming languages.

18. The computer program product of claim 10, wherein the analysis comprises a static source code analysis.

19. A system comprising:

a memory configured to store program instructions;

a processor operatively coupled to the memory to execute the program instructions to:

perform an analysis of source code of a monolith application to identify one or more structural features and one or more behavioral features;

generate a graph structure representing the monolith application based at least in part on the identified one or more structural features and the identified one or more behavioral features, wherein the graph structure comprises: a plurality of nodes, each node corresponding to one of a plurality of software modules of the monolith application, and a plurality of edges between the plurality nodes, each edge representing a relationship of the corresponding nodes;

automatically identify one or more constraints associated with the plurality of nodes in the graph structure based at least in part on the analysis of the source code;

train a graph convolutional neural network at least in part by updating a set of trainable parameters of the graph convolutional neural network over one or more iterations by jointly reducing multiple loss values, wherein at least one of the multiple loss values is associated with the one or more identified constraints;

use the graph convolutional neural network to cluster the plurality of nodes into one or more clusters;

determine one or more candidate microservices, wherein each of the one or more candidate microservices corresponds to a respective one of the one or more clusters; and modify one or more parts of the monolith application based on at least a portion of the one or more determined candidate microservices.

20. The system of claim 19, wherein the one or more structural features comprise one or more interclass dependencies associated with the plurality of software modules.

* * * * *